US010355423B2

(12) United States Patent
Islam

(10) Patent No.: US 10,355,423 B2
(45) Date of Patent: Jul. 16, 2019

(54) HYBRID CONNECTOR ASSEMBLY WITH INTEGRATED OVERVOLTAGE PROTECTION

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 90 days.

(21) Appl. No.: 15/786,919

(22) Filed: Oct. 18, 2017

(65) Prior Publication Data

US 2018/0115120 A1 Apr. 26, 2018

Related U.S. Application Data

(60) Provisional application No. 62/411,832, filed on Oct. 24, 2016.

(51) Int. Cl.
*H01R 33/945* (2006.01)
*H01R 13/66* (2006.01)
(Continued)

(52) U.S. Cl.
CPC ....... *H01R 13/6608* (2013.01); *H01R 13/627* (2013.01); *H01R 13/6658* (2013.01);
(Continued)

(58) Field of Classification Search
CPC .................................................. G02B 6/3817
(Continued)

(56) References Cited

U.S. PATENT DOCUMENTS

| 5,202,538 A | 4/1993 | Skirpan |
| 5,793,352 A * | 8/1998 | Greenberg ............. G09G 5/006 |
| | | 345/699 |

(Continued)

FOREIGN PATENT DOCUMENTS

| KR | 10-2015-0006712 A | 1/2015 |
| WO | WO 2013/063045 A1 | 5/2013 |
| WO | WO 2013/165831 A1 | 11/2013 |

OTHER PUBLICATIONS

U.S. Appl. No. 14/448,269, CommScope Technologies LLC, filed Jul. 31, 2014.
(Continued)

*Primary Examiner* — Phuong K Dinh
(74) *Attorney, Agent, or Firm* — Myers Bigel, P.A.

(57) ABSTRACT

A connector assembly with overvoltage protection includes: a housing having a cavity therein; a printed circuit board residing in the cavity of the housing; an overvoltage unit mounted on the printed circuit board and configured to create an open electrical circuit when experiencing a voltage higher than a predetermined threshold; a plurality of first electrical contacts adjacent a first edge of the printed circuit board and electrically connected to the overvoltage unit, each of the plurality of first electrical contacts configured to receive a respective one of a plurality of electrical conductors of a hybrid jumper cable; a plurality of second electrical contacts adjacent a second edge of the printed circuit board and electrically connected to the overvoltage unit, each of the plurality of second electrical contacts configured to receive a respective one of a plurality of electrical conductors of a piece of communications equipment; and a plurality of optical connectors mounted within the cavity configured to receive optical fibers of the hybrid jumper cable and the piece of communications equipment.

18 Claims, 4 Drawing Sheets

(51) Int. Cl.
*H01R 13/627* (2006.01)
*H01R 24/48* (2011.01)
*H02H 9/04* (2006.01)
*H01R 24/50* (2011.01)
*H01R 24/62* (2011.01)
*G02B 6/26* (2006.01)

(52) U.S. Cl.
CPC ......... *H01R 13/6666* (2013.01); *H01R 24/48* (2013.01); *H01R 24/50* (2013.01); *H01R 24/62* (2013.01); *H02H 9/042* (2013.01); *G02B 6/26* (2013.01)

(58) Field of Classification Search
USPC .............................. 439/577, 620.08, 620.22
See application file for complete search history.

(56) References Cited

U.S. PATENT DOCUMENTS

| | | | |
|---|---|---|---|
| 5,938,462 A | 8/1999 | Wilson et al. | |
| 6,711,337 B2 | 3/2004 | Hodge et al. | |
| 7,292,763 B2 | 11/2007 | Smith | |
| RE40,358 E | 6/2008 | Thompson et al. | |
| 7,477,824 B2 | 1/2009 | Reagan et al. | |
| 7,489,849 B2 | 2/2009 | Reagan et al. | |
| 7,805,044 B2 | 9/2010 | Reagan et al. | |
| 7,837,397 B2 | 11/2010 | Fingler et al. | |
| 7,844,158 B2 | 11/2010 | Gronvall et al. | |
| 7,893,567 B1 | 2/2011 | Deros et al. | |
| 8,275,228 B2 | 9/2012 | Livingston et al. | |
| 8,401,387 B2 | 3/2013 | Biegert et al. | |
| 8,532,490 B2 | 9/2013 | Smith et al. | |
| 8,565,571 B2 | 10/2013 | Kimbrell et al. | |
| 8,792,767 B2 | 7/2014 | Fabrykowski et al. | |
| 8,929,740 B2 | 1/2015 | Smith et al. | |
| 9,069,151 B2 | 6/2015 | Conner | |
| 9,078,287 B2 | 7/2015 | Khemakhem et al. | |
| 9,106,981 B2 * | 8/2015 | Vastmans | H02G 3/081 |
| 9,606,320 B2 | 3/2017 | Wang | |
| 9,742,176 B2 | 8/2017 | Wang | |
| 9,759,880 B2 | 9/2017 | Chamberlain et al. | |
| 10,048,446 B2 * | 8/2018 | Kelly | G02B 6/38 |
| 2005/0163448 A1 | 7/2005 | Blackwell, Jr. et al. | |
| 2005/0175307 A1 | 8/2005 | Battey et al. | |
| 2005/0213921 A1 | 9/2005 | Mertesdorf et al. | |
| 2006/0093303 A1 | 5/2006 | Reagan et al. | |
| 2009/0226181 A1 | 9/2009 | Fingler et al. | |
| 2011/0097052 A1 | 4/2011 | Solheid et al. | |
| 2012/0008257 A1 | 1/2012 | Rebers et al. | |
| 2012/0295486 A1 | 11/2012 | Petersen et al. | |
| 2013/0084050 A1 | 4/2013 | Vastmans et al. | |
| 2013/0088407 A1 | 4/2013 | King et al. | |
| 2013/0108227 A1 | 5/2013 | Conner | |
| 2013/0146355 A1 | 6/2013 | Strasser et al. | |
| 2014/0199079 A1 | 7/2014 | Smith et al. | |
| 2015/0270637 A1 | 9/2015 | Islam et al. | |
| 2016/0276817 A1 | 9/2016 | Wang | |

OTHER PUBLICATIONS

U.S. Appl. No. 15/071,620, CommScope Technologies LLC, filed Mar. 16, 2016.
U.S. Appl. No. 14/619,211, CommScope Technologies LLC, filed Feb. 11, 2015.
U.S. Appl. No. 14/701,904, CommScope Technologies LLC, filed May 1, 2015.
International Search Report and Written Opinion for corresponding PCT Application No. PCT/US2015/014347, dated May 15, 2015.
Supplemental European Search Report corresponding to European Application No. 15746886.9, dated Aug. 22, 2017.
Notification Concerning Transmittal of International Preliminary Report on Patentability for corresponding PCT Application No. PCT/US2016/022600 dated Sep. 28, 2017.
International Search Report and Written Opinion for corresponding PCT Application No. PCT/US2016/022600, dated Jun. 27, 2016.
Notification of Transmittal of the International Search Report and the Written Opinion of the International Searching Authority, or the Declaration for corresponding PCT Application No. PCT/US2017/052133, dated Jan. 11, 2018.

* cited by examiner

HYBRID CONNECTOR ASSEMBLY WITH INTEGRATED OVERVOLTAGE PROTECTION

RELATED APPLICATION

The present application claims priority from and the benefit of U.S. Provisional Patent Application No. 62/411,832, filed Oct. 24, 2016, the disclosure of which is hereby incorporated herein in its entirety

FIELD OF THE INVENTION

The present invention relates generally to power and signal distribution, and more particularly to power and signal distribution from hybrid cables.

BACKGROUND

Latest developments in technology for delivering power and data in wireless infrastructure use hybrid cables, wherein the term "hybrid cable" is intended to mean a cable that includes both power conductors and one or more fiber optic cords or cables. An exemplary hybrid cable is the HFF cable, available from CommScope, Inc. (Joliet, Ill.). Unlike RF-based systems, a single hybrid trunk cable can be used to power multiple sectors, thereby eliminating multiple runs of RF cable. Hybrid jumper cables can be routed from a distribution unit (see, e.g., U.S. patent application Ser. No. 15/071,620, filed Mar. 16, 2016 and incorporated herein by reference) to a piece of equipment, such as a remote radio unit (RRU) or antenna.

In many instances a hybrid jumper cable will be connected via a connector to an RRU that has a mating connector mounted on a bulkhead or the like.

At some sites it is desirable to provide overvoltage protection (OVP) for the RRU. OVP is usually supplied via a separate mounted enclosure that is connected to the power conductors of a hybrid trunk cable. Jumper cords are then connected from the mounted enclosure to RRUs. These additional connection add time and expense to the interconnection process. Alternatively, the RRU may have an OVP unit mounted internally, which adds cost to the RRU. It may be desirable to provide additional configurations for providing OVP at the top of an antenna tower.

SUMMARY

As a first aspect, embodiments of the invention are directed to a connector assembly with overvoltage protection. The assembly comprises: a housing having a cavity therein: a printed circuit board residing in the cavity of the housing; an overvoltage unit mounted on the printed circuit board and configured to create an open electrical circuit when experiencing a voltage higher than a predetermined threshold; a plurality of first electrical contacts adjacent a first edge of the printed circuit board and electrically connected to the overvoltage unit, each of the plurality of first electrical contacts configured to receive a respective one of a plurality of electrical conductors of a hybrid jumper cable; a plurality of second electrical contacts adjacent a second edge of the printed circuit board and electrically connected to the overvoltage unit, each of the plurality of second electrical contacts configured to receive a respective one of a plurality of electrical conductors of a piece of communications equipment; and a plurality of optical connectors mounted within the cavity configured to receive optical fibers of the hybrid jumper cable and the piece of communications equipment.

As a second aspect, embodiments of the invention are directed to a cable-connector assembly with overvoltage protection, comprising: a hybrid jumper cable having a plurality of electrical conductors and a plurality of optical fibers; and a connector assembly. The connector assembly comprises: a housing having a cavity therein: a printed circuit board residing in the cavity of the housing; an overvoltage unit mounted on the printed circuit board and configured to create an open electrical circuit when experiencing a voltage higher than a predetermined threshold; a plurality of first electrical contacts adjacent a first edge of the printed circuit board and electrically connected to the overvoltage unit, each of the plurality of first electrical contacts receiving a respective one of the plurality of electrical conductors of the hybrid jumper cable; a plurality of second electrical contacts adjacent a second edge of the printed circuit board and electrically connected to the overvoltage unit, each of the plurality of second electrical contacts configured to receive a respective one of a plurality of electrical conductors of a piece of communications equipment; and a plurality of optical connectors mounted within the cavity receiving optical fibers of the hybrid jumper cable and the piece of communications equipment.

As a third aspect, embodiments of the invention are directed to a connector assembly with overvoltage protection, comprising: a housing having a cavity therein: a printed circuit board residing in the cavity of the housing; an overvoltage unit mounted on the printed circuit board and configured to create an open electrical circuit when experiencing a voltage higher than a predetermined threshold; a plurality of first electrical contacts adjacent a first edge of the printed circuit board and electrically connected to the overvoltage unit, each of the plurality of first electrical contacts configured to receive a respective one of a plurality of electrical conductors of a hybrid jumper cable; a plurality of second electrical contacts adjacent a second edge of the printed circuit board and electrically connected to the overvoltage unit, each of the plurality of second electrical contacts configured to receive a respective one of a plurality of electrical conductors of a piece of communications equipment; and a plurality of optical connectors mounted within the cavity configured to receive optical fibers of the hybrid jumper cable and the piece of communications equipment. The assembly further comprises a frame that resides within the housing, the frame configured to provide routing for optical fibers of a hybrid trunk cable, and a wall in the cavity of the housing, wherein the optical connectors are mounted on the wall.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
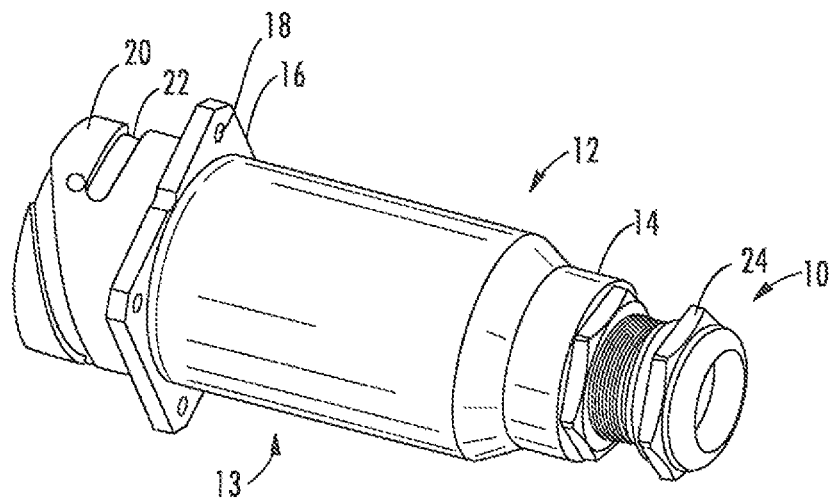
FIG. 1 is a front perspective view of a connector assembly with overvoltage protection (OVP) according to embodiments of the present invention.

Referring now to the drawings, a connector assembly with overvoltage protection (OVP), designated broadly at 10, is shown in FIG. 1. The connector assembly 10 includes a generally cylindrical cover 12 that narrows at one end to a neck 14. At the opposite end, the cover 12 abuts a square flange 16 with holes 18 in the corners. A cylindrical fitting 20 with a circumferential groove 22 is mounted on the side of the flange 16 opposite the cover 14. The fitting 20 is configured to mate with a hybrid connector (not shown) on an RRU, antenna, or similar piece of communications equipment. Together the cover 12, the flange 16 and the fitting 20 form a cover 13 of the assembly 10.

Figure 5:
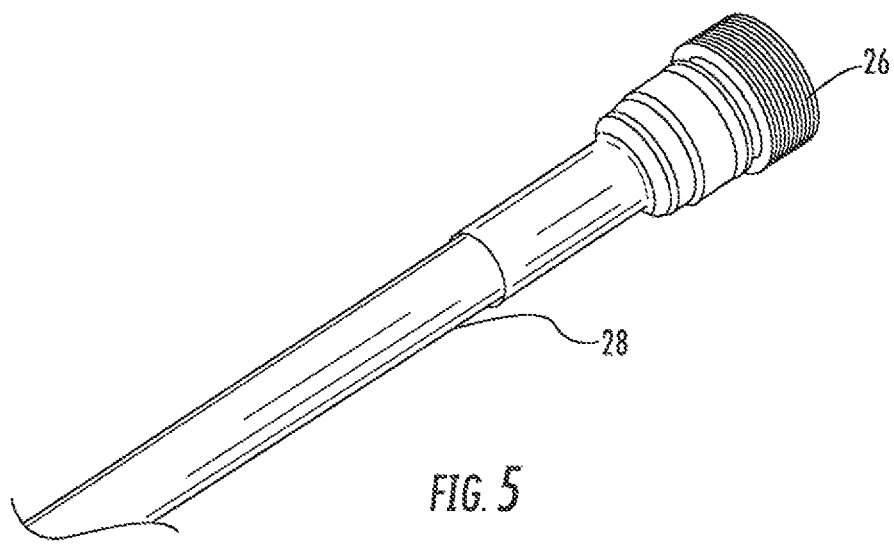
FIG. 5 is a perspective view of a jumper cable to be attached to the back nut of the connector assembly of FIG. 1.

A back nut 24 is mounted to the neck 14 of the cover 12 and is configured to mate with a connector 26 of a hybrid jumper cable 28 (see FIG. 5). Although specific configurations are illustrated for the fitting 20 and the back nut 24, it is contemplated that the fitting and back nut 24 may take any configuration that enables the connector assembly 10 to interconnect with a hybrid cable and a piece of electronic equipment.

Figure 2:
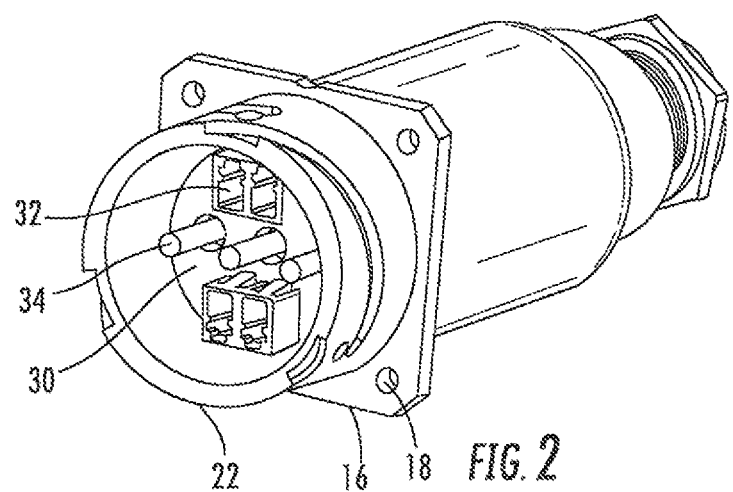
FIG. 2 is a rear perspective view of the connector assembly of FIG. 1.

Referring now to FIG. 2, within the fitting 20 the connector assembly 10 has a wall 30 that spans the inner diameter of the fitting 20. Three conductive contact pins 34 are mounted to the wall 30 and extend therethrough (see also FIG. 4). Also, four optical connectors 32 are mounted to the wall 30, with two optical connectors 32 positioned above the contact pins 34 and two optical connectors 32 positioned below the contact pins 34.

Figure 3:
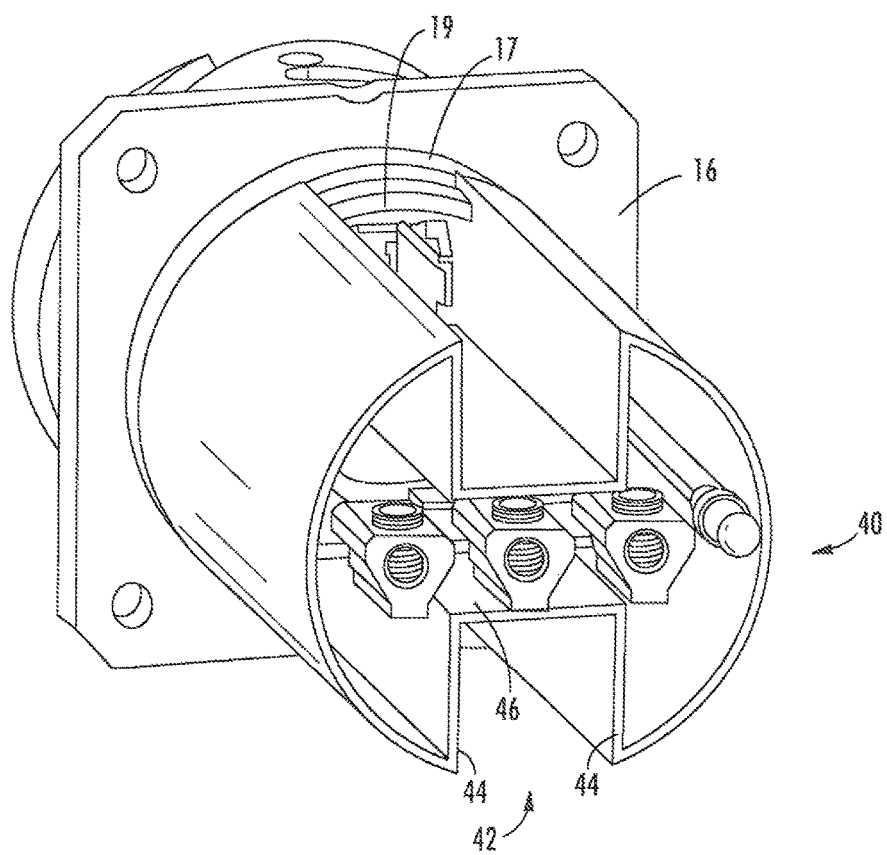
FIG. 3 is a front, left perspective view of the connector assembly of FIG. 1 with the cover and back nut removed.
Figure 4:
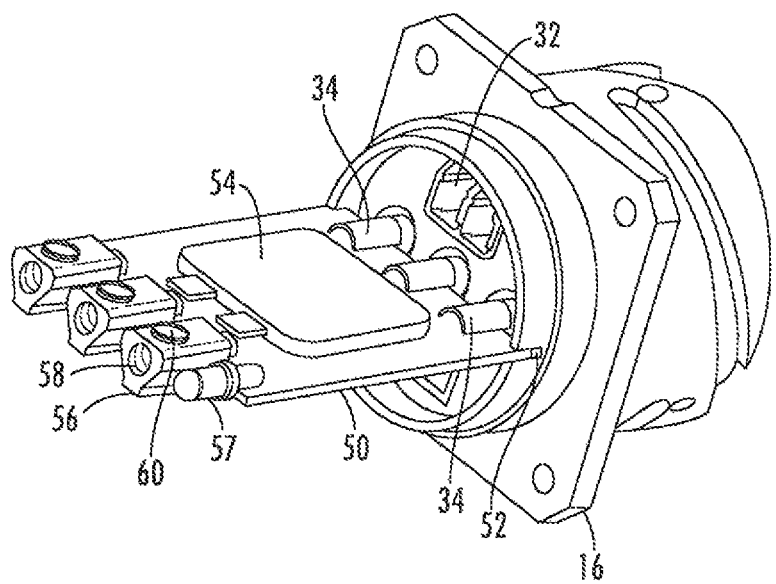
FIG. 4 is a front, right view of the connector assembly as in FIG. 3 with the frame removed.

Referring now to FIGS. 3 and 4, a frame 40 is mounted to the flange 16 within the cavity of the cover 12. The flange 16 has a circular lip 17 with two protrusions 19 in diametrically opposed locations on the lip 17. The frame 40 is generally cylindrical, with two recesses 42 lined by walls 44 and a floor 46. The frame 40 abuts the lip 17, with the protrusions 19 extending into the recesses 42 to help to align the frame 40 relative to the flange 16.

Referring now to FIG. 4 (in which the frame 40 is removed for clarity), the connector assembly 10 further includes a printed circuit board 50. The printed circuit board 50 is mounted in the lip 17 via two slots 52. An OVP unit 54 is mounted onto the upper surface of the printed circuit board 50. The OVP unit 54, which is configured to create an open electrical circuit when experiencing a voltage higher than a predetermined threshold, can take a conventional form known to those of skill in this art and need not be described in detail herein. It may take the form of a metal-oxide varistor (MOV). The OVP unit 54 may also include one or more LEDs 57 and/or an alarm (not shown) to alert an operator to an overvoltage event.

The ends of the three contact pins 34 that extend through the wall 30 are attached to the nearest edge of the circuit board 50. The contact pins 34 are electrically connected with the OVP unit 54 via traces, vias or the like on the printed circuit board 50. Three electrical ports 56 are mounted to the edge of the printed circuit board 50 opposite the contact pins 34. Each of the electrical ports 56 includes a hole 58 for receiving a conductor from the hybrid jumper cable 28 and a set screw 60 for securing the conductor. The electrical ports 56 are electrically connected to the OVP unit 54 by traces, vias or the like.

In this embodiment, it is anticipated that two of the ports 56 and contact pins 34 may be used for power transmission, and one of the ports 56 and contact pins 34 may be used for grounding. Alternatively, the frame 40 or the cover 12 may be used as a grounding surface if formed of or plated with metal.

It can also be seen in FIG. 4 that the four optical connectors 32 discussed above extend through the wall 30. As can be seen in FIG. 3, the optical connectors 32 are positioned so that they align with the recesses 42 in the frame 40, which enable optical fibers from the hybrid jumper cable 28 to be connected therein. Any number of optical connector interfaces may be employed, such as LC, SC, MPO, or HMOC. Although four optical connectors 32 are shown herein, any desired number of optical connectors (e.g., from 2-36 connectors).

The connector assembly 10 can be employed in three different ways. First, it may be attached to the end of a hybrid jumper cable. In this scenario, the conductors of the hybrid jumper cable are connected to the ports 56 of connector assembly 10 or connected directly to the printed circuit board 30 (via soldering or the like), and the optical fibers of the hybrid jumper cable are mated with the optical connectors 32. The fitting 22 of the connector assembly 10 can be attached to a mating fitting of an RRU or the like, with the contact pins 34 and the optical connectors 32 serving as connection points with the conductors and optical fibers of the RRU. The holes 18 in the flange 16 of the cover 12 can optionally be used to secure the connector assembly 10 to the RRU.

Alternatively, the connector assembly 10 can be integrated into an RRU, antenna or similar equipment, serving as a hybrid receptacle for a hybrid jumper cable to be attached to the RRU/antenna. Conductors of the hybrid jumper cable can be attached to the ports 56 of the connector assembly 10, or ports of another configuration may be employed. The optical fibers of the hybrid jumper cable may be connected with the optical connectors 32.

As another alternative, the connector assembly 10 may be used as a component separate from both the hybrid jumper cable and the RRU, and may be attached to both as described above.

Figure 6:
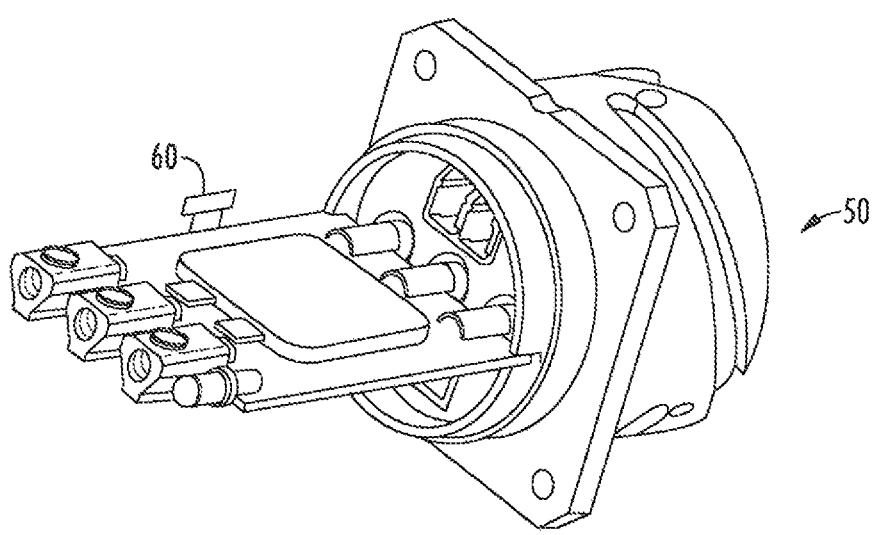
FIG. 6 is a front, right view of a connector assembly according to alternative embodiments of the invention with the cover, back nut and frame removed.

Referring now to FIG. 6, an alternative embodiment of the printed circuit board is shown therein and designated broadly at 50'. The printed circuit board 50' includes a capacitor 60 (shown schematically in FIG. 6). The presence of the capacitor 60 may dampen increases in the voltage of the power signal that result from changes in the current drawn by the RRU and by dI/dt voltage spikes. As such, a sudden decrease in the current level of the power signal due to a sudden drop in the loading of the RRU may result in a smaller and slower reduction in the voltage drop, and hence the capacitor 60 (which may be in the form of a shunt capacitance unit, and may include more than one capacitor) may help protect the RRU from situations where the current of the power signal drops more quickly than the voltage of the power signal output by the power supply can be adjusted. Such capacitor configurations are discussed in detail in U.S. patent application Ser. No. 14/619,211, filed Feb. 11, 2015, and Ser. No. 14/701,904, filed May 1, 2015, both of which are incorporated herein in full by reference.

In any of these configurations, the connector assembly 10 can provide OVP capability between a cable and an RRU connected thereto. Because the conductors to the RRU are all routed through the OVP unit 54, a voltage surge along such conductors necessarily passes through the OVP unit 54, which can protect the RRU by creating an open circuit when the voltage exceeds a predetermined level.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A connector assembly with overvoltage protection, comprising:
    a housing having a cavity therein:
    a printed circuit board residing in the cavity of the housing;
    an overvoltage unit mounted on the printed circuit board and configured to create an open electrical circuit when experiencing a voltage higher than a predetermined threshold;
    a plurality of first electrical contacts adjacent a first edge of the printed circuit board and electrically connected to the overvoltage unit, each of the plurality of first electrical contacts configured to receive a respective one of a plurality of electrical conductors of a hybrid jumper cable;
    a plurality of second electrical contacts adjacent a second edge of the printed circuit board and electrically connected to the overvoltage unit, each of the plurality of second electrical contacts configured to receive a respective one of a plurality of electrical conductors of a piece of communications equipment; and
    a plurality of optical connectors mounted within the cavity configured to receive optical fibers of the hybrid jumper cable and the piece of communications equipment.

2. The connector assembly defined in claim 1, further comprising a hybrid cable attached to the housing.

3. The connector assembly defined in claim 1, further comprising a piece of electrical equipment attached to the housing.

4. The connector assembly defined in claim 1, further comprising a frame that resides within the housing, the frame configured to provide routing for optical fibers of a hybrid trunk cable.

5. The connector assembly defined in claim 4, wherein the printed circuit board is positioned within the frame.

6. The connector assembly defined in claim 5, wherein the frame has two recesses that provide the routing for optical fibers, the two recesses of the frame being positioned on opposite sides of the printed circuit board.

7. The connector assembly defined in claim 1, further comprising a wall in the cavity of the housing, wherein the optical connectors are mounted on the wall.

8. The connector assembly defined in claim 1, wherein the housing includes a mounting flange configured for mounting to a bulkhead of a piece of communications equipment and a fitting configured to mate with the piece of electronic equipment.

9. A cable-connector assembly with overvoltage protection, comprising:
    a hybrid jumper cable having a plurality of electrical conductors and a plurality of optical fibers; and
    a connector assembly comprising:
        a housing having a cavity therein:
        a printed circuit board residing in the cavity of the housing;
        an overvoltage unit mounted on the printed circuit board and configured to create an open electrical circuit when experiencing a voltage higher than a predetermined threshold;
        a plurality of first electrical contacts adjacent a first edge of the printed circuit board and electrically connected to the overvoltage unit, each of the plurality of first electrical contacts receiving a respective one of the plurality of electrical conductors of the hybrid jumper cable;
        a plurality of second electrical contacts adjacent a second edge of the printed circuit board and electrically connected to the overvoltage unit, each of the plurality of second electrical contacts configured to receive a respective one of a plurality of electrical conductors of a piece of communications equipment; and
        a plurality of optical connectors mounted within the cavity receiving optical fibers of the hybrid jumper cable and the piece of communications equipment.

10. The connector assembly defined in claim 9, further comprising a frame that resides within the housing, the frame configured to provide routing for optical fibers of a hybrid trunk cable.

11. The connector assembly defined in claim 10, wherein the printed circuit board is positioned within the frame.

12. The connector assembly defined in claim 11, wherein the frame has two recesses that provide the routing for optical fibers.

13. The connector assembly defined in claim 12, wherein the two recesses of the frame are positioned on opposite sides of the printed circuit board.

14. The connector assembly defined in claim 10, further comprising a wall in the cavity of the housing, wherein the optical connectors are mounted on the wall.

15. A connector assembly with overvoltage protection, comprising:
- a housing having a cavity therein:
- a printed circuit board residing in the cavity of the housing;
- an overvoltage unit mounted on the printed circuit board and configured to create an open electrical circuit when experiencing a voltage higher than a predetermined threshold;
- a plurality of first electrical contacts adjacent a first edge of the printed circuit board and electrically connected to the overvoltage unit, each of the plurality of first electrical contacts configured to receive a respective one of a plurality of electrical conductors of a hybrid jumper cable;
- a plurality of second electrical contacts adjacent a second edge of the printed circuit board and electrically connected to the overvoltage unit, each of the plurality of second electrical contacts configured to receive a respective one of a plurality of electrical conductors of a piece of communications equipment; and
- a plurality of optical connectors mounted within the cavity configured to receive optical fibers of the hybrid jumper cable and the piece of communications equipment;
- further comprising a frame that resides within the housing, the frame configured to provide routing for optical fibers of a hybrid trunk cable; and
- a wall in the cavity of the housing, wherein the optical connectors are mounted on the wall.

16. The connector assembly defined in claim 15, wherein the printed circuit board is positioned within the frame.

17. The connector assembly defined in claim 16, wherein the frame has two recesses that provide the routing for optical fibers.

18. The connector assembly defined in claim 17, wherein the two recesses of the frame are positioned on opposite sides of the printed circuit board.

* * * * *